Oct. 16, 1945.  T. E. McFALL ET AL  2,387,084
PISTON RING STRUCTURE
Filed Oct. 26, 1938  3 Sheets-Sheet 1

Inventors
Thurlow E. McFall
Oliver G. Norton
By Livenance and
Van Antwerp
Attorneys

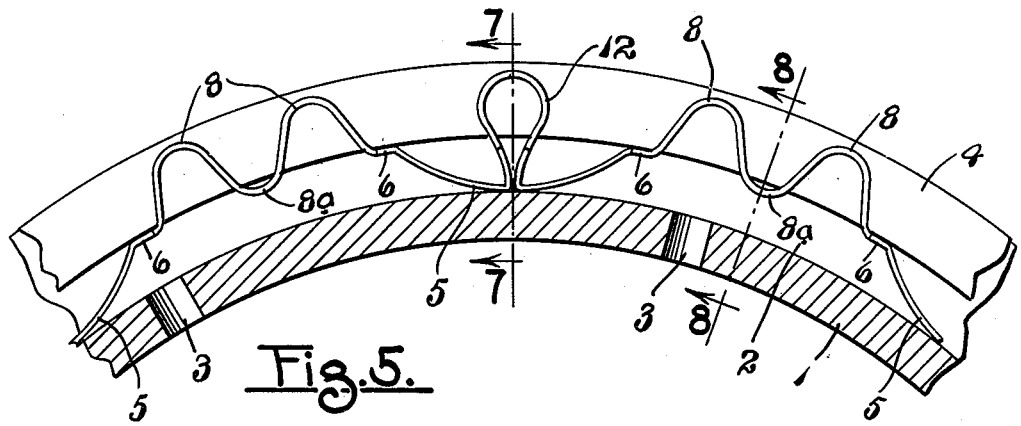
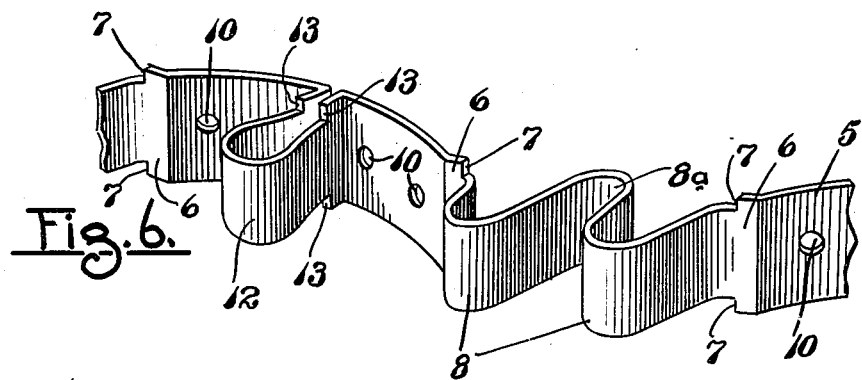
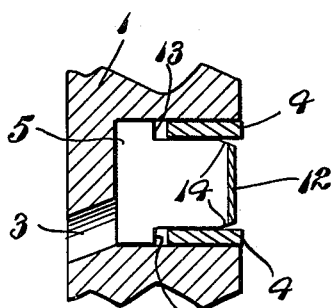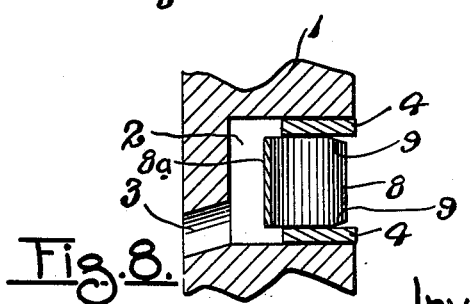

Oct. 16, 1945.   T. E. McFALL ET AL   2,387,084
PISTON RING STRUCTURE
Filed Oct. 26, 1938   3 Sheets-Sheet 3

Inventors
Thurlow E. McFall
Oliver G. Norton
Attorneys

Patented Oct. 16, 1945

2,387,084

UNITED STATES PATENT OFFICE 2,387,084

PISTON RING STRUCTURE

Thurlow E. McFall, Sparta, and Oliver G. Norton, Muskegon, Mich., assignors, by mesne assignments, to The Perfect Circle Company, Hagerstown, Ind., a corporation of Indiana Application October 26, 1938, Serial No. 236,976

4 Claims. (Cl. 309—45)

This invention relates to piston rings particularly useful with pistons of internal combustion engines. Such pistons and the rings thereof require lubrication, and at the same time there should be as little passage of oil beyond the piston to the combustion chamber as possible. Therefore, the ring groove of the piston farthest away from the combustion chamber is generally supplied with an oil drainage ring which removes excess of oil from the cylinder walls and drains the same through the ring to the bottom of the piston ring groove, from which passages lead to the interior of the piston for return of the oil to the crank case.

With our invention a very novel and economical piston ring is provided which is capable of removing the excess of oil from the cylinder walls in a very efficient fashion, and in which those parts of the piston ring which bear against the cylinder walls are held thereagainst with a yielding spring pressure. Moreover with our invention the contact of the oil scraping members of the ring with the cylinder walls is relatively small in area, thereby assuring a high unit wall pressure for a relatively moderate ring tension, thus promoting efficient oil scraping action without unduly increasing friction losses and cylinder wear. The ring which has been provided is particularly useful and practical.

An understanding of the invention may be had from the following description, taken in connection with the accompanying drawings, in which:

Fig. 5 is a fragmentary view similar to Fig. 1, showing a modification in structure.

Fig. 6 is a fragmentary perspective view similar to Fig. 4, illustrating the modification in structure of the intermediate member of the ring.

Figs. 7 and 8 are sections substantially on the planes of lines 7—7 and 8—8 of Fig. 5.

Figure 9:
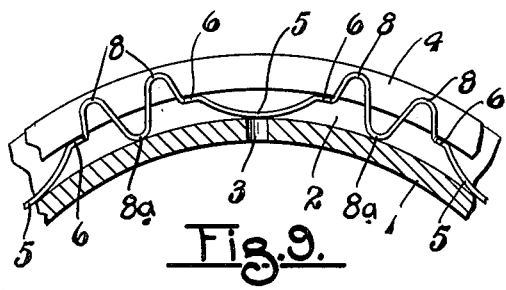

Fig. 9 is a fragmentary view similar to Fig. 5, illustrative of a further slight modification in structure.

Figure 10:
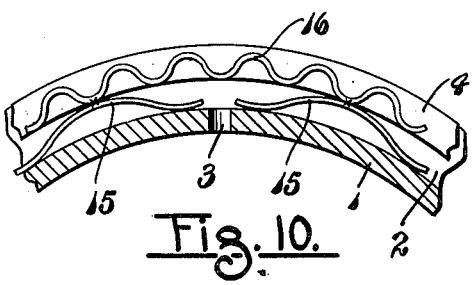

Fig. 10 is a fragmentary view of the same character as Figs. 5 and 9 of a yet further modification.

Figure 11:
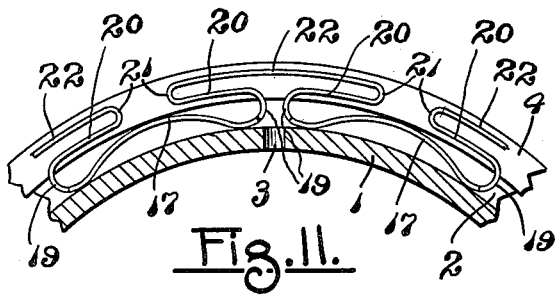

Fig. 11 is a similar view showing a considerably different modification in structure and one which for many reasons may be preferred.

Figure 12:
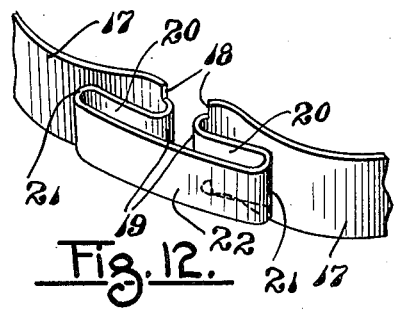

Fig. 12 is a fragmentary perspective view of a part of the ring spreading and spacing member shown in Fig. 11.

Figure 13:
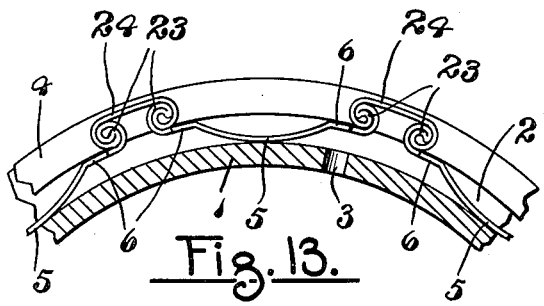
Figure 14:
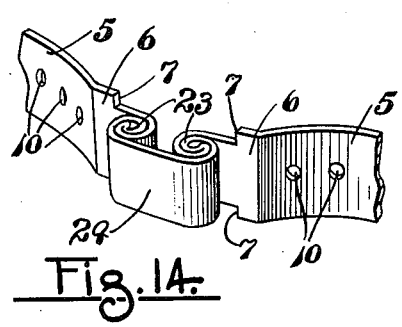

Fig. 13 is a still further modification in structure and showing a different form of spacing and spreading member, and Fig. 14 is a perspective view of a portion thereof.

Like reference characters refer to like parts in the different figures of the drawings.

The piston 1 is of conventional construction in which, adjacent at its end farthest away from the crank shaft, a plurality of ring receiving grooves 2 are cut around the piston in one or more of which grooves the ring of our invention is to be placed. The groove has passages 3 through the walls of the piston connecting the bottom of the ring groove with the interior of the piston, which is hollow.

Figures 1, 2, 3, 4:
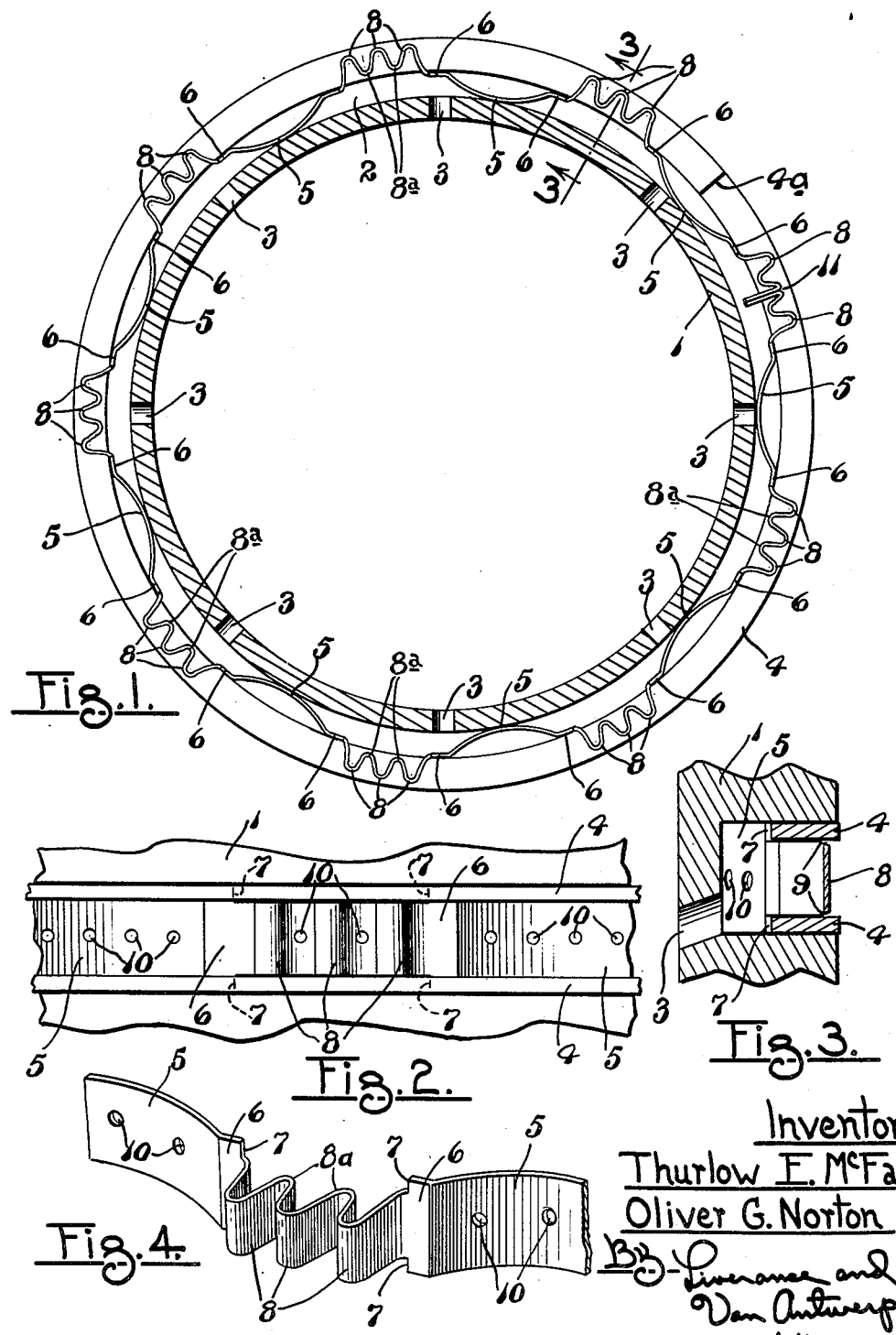
Fig. 1 is a transverse section through a piston at the innermost ring groove, the piston ring being shown in plan, with one of the narrow ring members removed.
Fig. 2 is a fragmentary elevation of the piston and the ring of our invention.
Fig. 3 is a fragmentary section taken longitudinally of the piston and transversely of the ring, on the plane of line 3—3 of Fig. 1.
Fig. 4 is a perspective view of a fragmentary part of the intermediate member of the ring.

The piston ring of our invention includes two thin lateral ring elements 4, usually of steel but which may optionally be constructed of any suitable material or materials which combine the desired characteristics of elasticity, structural strength and wear resistance, each being parted at one side as at 4a (Fig. 1). These ring elements 4 are of substantially circular outline when compressed within the cylinder bore and are generally between twenty and forty thousandths of an inch in thickness, though it is to be understood that the design of the ring element 4 is not necessarily restricted to the specific construction or dimensions herein disclosed, but that either or both of them may optionally be composed of multiple juxtaposed circular segments or of any other suitable construction designed to more effectively limit the quantity of lubricating oil conveyed along the cylinder walls into the combustion chamber. When installed in a ring groove such as the groove 2, one of these ring members 4 lies against the upper side of the groove and the other at the lower side, whereby between the adjacent sides of the ring elements 4 there is a considerable annular space.

The ring is completed by a spring ribbon member which is formed with a series of consecutive spaced apart bows 5 of curved form substantially as shown, the inwardly bowed portions of which are designed to bear against the bottom of the piston ring groove and the end portions being curved outwardly. At each end of each bow 5 are integral short ledges 6, the adjacent ends of which are integrally connected by a section which is bent into a plurality of reverse curves substantially of accordion form, the outer bends of which are indicated at 8 and the inner bends at 8a. This reversely folded intermediate section is of less width than the parts 5 and 6, portions of the material being removed at both the upper and lower edge portions of said intermediate sections, thereby leaving shoulders 7 at the edges of the ledges 6, the height of which is substantially equal to the thickness of the ring elements 4. The reversely bent sections having the bends 8 and 8a therein extend outwardly between the adjacent sides of the ring elements 4, spacing them apart and holding them in their positions against the upper and lower sides of the ring groove respectively. Preferably, at the upper and lower edges of the outer bends 8 the metal is cut away or chamfered, as indicated at 9, for ease of installation. Likewise the sections 5 and the intermediate accordion folded sections therebetween may have openings 10 of suitable shape and cross sectional area, pierced, slotted or notched for the passage of oil to the ring groove from whence it may pass inwardly through the openings at 3 to the interior of the piston. One of the bends 8 or 8a in one of the intermediate sections may be modified to provide a parting in the spring ribbon element as indicated at 11 or the ends of the spring strip may optionally be riveted, clipped, welded, brazed or otherwise suitably united to form a substantially continuous band if so desired. The inwardly extending bend or bends 8a may and preferably should be formed to sufficient depth so that when the assembly is in working position and compressed within the cylinder, they contact the bottom of piston groove 2 in order to position and stabilize the spring. (See Fig. 9.) When so formed, the bend or bends 8a extend inwardly beyond the inner edge of side members 4, thus providing passage for oil without the necessity of piercing or notching the spring where narrowed to act as a spacer, thus reducing the hazard of breakage due to weakening of the section by notching, slotting, or piercing in this narrowed section.

With this construction of ring as described and when assembled in a piston ring groove the inner edges of the ring elements 4 come against the upper and lower end portions of the ledges 6, with the accordion bent sections of the intermediate ring element extending outwardly and spacing the flat ring elements 4 from each other. The curvature of bowed sections 5 is flattened and ledges 6 are deflected inwardly when the ring members 4 are compressed to close the partings at 4a when installed in a cylinder, whereby the bowed sections 5 exert a pressing force against the ring elements 4 to push the same outwardly into operative bearing contact with the cylinder walls. The space between the ring elements 4 provides an oil collecting space for oil which is scraped from the walls of the cylinder and such excess of oil is carried inwardly and drained through the passages at 3.

In Figs. 5 to 8, inclusive, a modification in the form of the intermediate spring element of the ring is made. Each of the intermediate sections 5 is formed with a forwardly projecting integral portion 12 of the substantially balloon shape shown in Fig. 5, while the bends of the intermediate reversely bent sections are reduced in number, there being shown two instead of three folds, as in Fig. 1. The part 12 likewise has part of the material cut away at both its upper and lower edges for a distance equal to the thickness of the ring elements 4, providing the shoulders shown at 13, and such section 12 at its upper and lower edges and at its outer portion is likewise chamfered as at 14 for oil passage. With this construction the ring elements 4 are supported in spaced apart relation from each other more uniformly and at a greater number of points than in the structure shown in Fig. 1.

In Fig. 9 the intermediate inward bends 8a are extended farther inward than in Figs. 1 and 5 so as to reach the bottom of the ring groove 2. This will materially aid in stabilizing the piston ring structure and for this reason is preferred over the structures shown in Figs. 1 and 5.

In Fig. 10 a plurality of separate bowed members 15 made of flat spring metal of a width slightly less than the width of the ring groove 2 are connected to selected inwardly extending bends of an outer member 16 which is continuously corrugated throughout its length, being made from a strip of thin material of less width than the width of the material of the bowed portions 15, whereby the ring members 4 are spaced apart from each other by the member 16 and bear at their inner edges against the bowed members 15 which are flexed and flattened inwardly when the ring is installed in a piston ring groove and the piston and ring within a cylinder.

Figs. 11 and 12 show a form of construction with inner bowed portions 17 which adjacent their ends bear against the bottom of the ring groove 2, the material then being narrowed and curved into return bends 19, one at each end of the bowed section 17, thence continued back in two straight sections 20 which approach each other and are then U-bent at 21, joining integrally with an outer connecting section at 22. This provides a spacing and spreader member for the ring members 4, which are held apart by the elongated loops provided by the sections 20 and 22 and the connecting bends 21. The ring members 4 bear against the central portions of the bowed sections 17. Shoulders 18 are provided where the material of the spacing and spreader member is reduced in width as shown in Fig. 12.

In Fig. 13 the series of bowed sections 5 bear at their middle points against the bottom of the ring groove 2 and at each end have the same ledges 6 and the shoulders 7 where the material is reduced in width. As a substitute for the accordion bent sections having the bends 8 and 8a between the adjacent ends of the bows 5, the thin metal is wound into coils such as shown at 23 which are connected integrally by a bridging section 24 between the coils. Such coils and bridging section 24 lie between the ring members 4 the same as the accordion bent portions 8, 8a in the first described structure. In all of these forms of construction substantially the same results were attained, the proper spacing of the upper and lower thin ring members 4 from each other, and a yielding engagement against their inner edges, the tendency of which is to force said ring members outwardly and cause their outer edges to bear against the cylinder walls.

While we have shown the several specific forms of structure, it is to be understood that many other variations in detail of structure may be resorted to without departing from the invention. The intermediate member of the ring assembly is made from thin flat ribbon spring steel stock preferably and may be of a thickness and form so as to provide the necessary pressure of the outer ring members 4 at their outer edges against the cylinder walls. The constructions are inexpensive to make, are readily assembled and installed in a ring groove, provide the necessary tension for the parts 4 of the ring which bear against the cylinder walls, and have ample passage for the oil which is collected by the ring and carried to the bottom of the ring groove.

The invention is defined in the appended claims and is to be considered comprehensive of all forms of structure coming within their scope.

While there has been shown the ring members 4 as thin flat ring members, it is to be understood that by the term ring members not only will a single member such as shown at 4 be comprehended, but that a composite structure consisting of two or more thin members or a plurality of them so long as they occupy the same position and serve the same purpose, is comprehended by the invention and the claims appended hereto.

We claim:

1. A piston ring structure comprising, two spaced parallel thin metallic ring members, and an annular expander of thin spring steel material having spaced apart inwardly bowed portions at the inner sides of said ring members, and adapted to bear at their ends against the inner edges of said ring members, said expander between said inwardly bowed portions being formed into a plurality of outwardly extending corrugations projecting into the space between the ring members to a point close to the outer periphery of said ring members, the axial width of the corrugations being less than the axial width of the bowed portions at each edge thereof by a distance equal to the thickness of one of said ring members.

2. A piston ring construction comprising, two spaced parallel thin and flat metallic ring members each having a parting in a side thereof, and a spreader member associated with the ring members formed from a single length of thin flat spring material and having inwardly bowed portions at spaced intervals in the length thereof adapted to bear at their ends against the inner edges of the ring members and intermediate their ends against the bottom of a piston ring groove, said spreader between the ends of each bowed portion and also between the ends of consecutive bowed portions having outwardly extending projecting portions of less width than said bowed portions lying between and holding the ring members in spaced relation to each other.

3. A combined spacer and expander member for use with a plurality of thin piston rings, said member being annular and formed of resilient material and including circumferentially spaced inwardly bowed portions adapted to engage at their intermediate portion the bottom of a ring groove and adapted to bear at their ends against the inner edges of said ring members, said expander member between said inwardly bowed portions being formed into a plurality of outwardly extending corrugations of such dimensions as to project into the space between the ring members to a point close to the outer periphery of said ring members, the axial width of the corrugations being less than the axial width of the bowed portions at each edge thereof for a distance equal to the thickness of one of said ring members.

4. A combined spacer and expander member for use with a plurality of thin piston rings, said member being formed from a single length of thin spring material and having inwardly bowed portions at spaced intervals in the length thereof adapted to bear at their ends against the inner edges of said piston rings and intermediate their ends against the bottom of a piston ring groove, said member between the ends of each bowed portion and also between the ends of consecutive bowed portions having outwardly extending projecting portions of less width than said bowed portions adapted to lie between and hold said ring members in spaced relation to each other.

THURLOW E. McFALL.
OLIVER G. NORTON.